United States Patent
Lane

(10) Patent No.: US 6,626,486 B2
(45) Date of Patent: Sep. 30, 2003

(54) WIND DEFLECTOR INCLUDING AN OPERATING ELEMENT FOR A SLIDING ROOF SYSTEM

(75) Inventor: Peter Lane, Otzberg (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/225,595

(22) Filed: Aug. 22, 2002

(65) Prior Publication Data

US 2003/0042764 A1 Mar. 6, 2003

(30) Foreign Application Priority Data

Aug. 28, 2001 (DE) .......................... 101 42 047

(51) Int. Cl.[7] .................................................. B60J 7/22
(52) U.S. Cl. ........................................................ 296/217
(58) Field of Search ......................................... 296/217

(56) References Cited

U.S. PATENT DOCUMENTS

| 4,626,085 A | * 12/1986 | Suzuki ......................... 350/604 |
|---|---|---|
| 5,833,305 A | 11/1998 | Watzlawick et al. |
| 5,836,066 A | 11/1998 | Ingram |
| 5,975,468 A | * 11/1999 | Moignier et al. ........... 244/173 |
| 6,096,969 A | * 8/2000 | Fujita et al. ................. 136/259 |
| 6,174,025 B1 | * 1/2001 | Henderson, III et al. ... 296/217 |
| 6,298,662 B1 | * 10/2001 | Vezain et al. .................. 60/257 |
| 6,390,878 B1 | * 5/2002 | Zhou et al. .................... 446/14 |

FOREIGN PATENT DOCUMENTS

| DE | 3834490 | 4/1990 |
|---|---|---|
| DE | 198 20 301 A1 | 7/1999 |
| DE | 19934011 | 2/2001 |
| WO | WO 01/10660 | 2/2001 |

* cited by examiner

Primary Examiner—Dennis H. Pedder
(74) Attorney, Agent, or Firm—Carlson, Gaskey & Olds

(57) ABSTRACT

A wind deflector includes an operating element for a sliding roof system. The wind deflector is movable by means of the operating element between a raised position and a lowered position. The operating element consists of a shape memory alloy so that as a function of its temperature it can assume one of a first and second states.

14 Claims, 5 Drawing Sheets

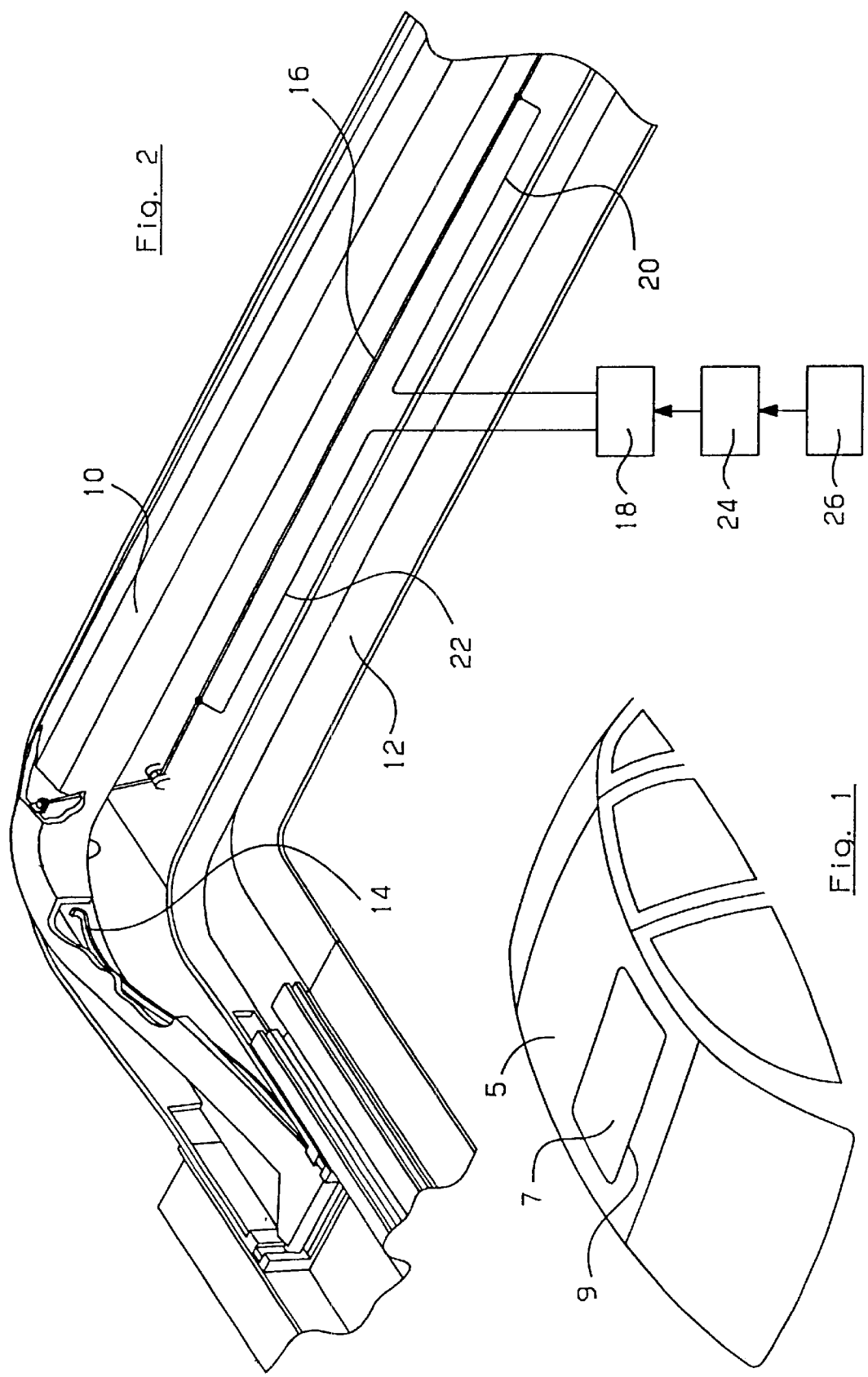

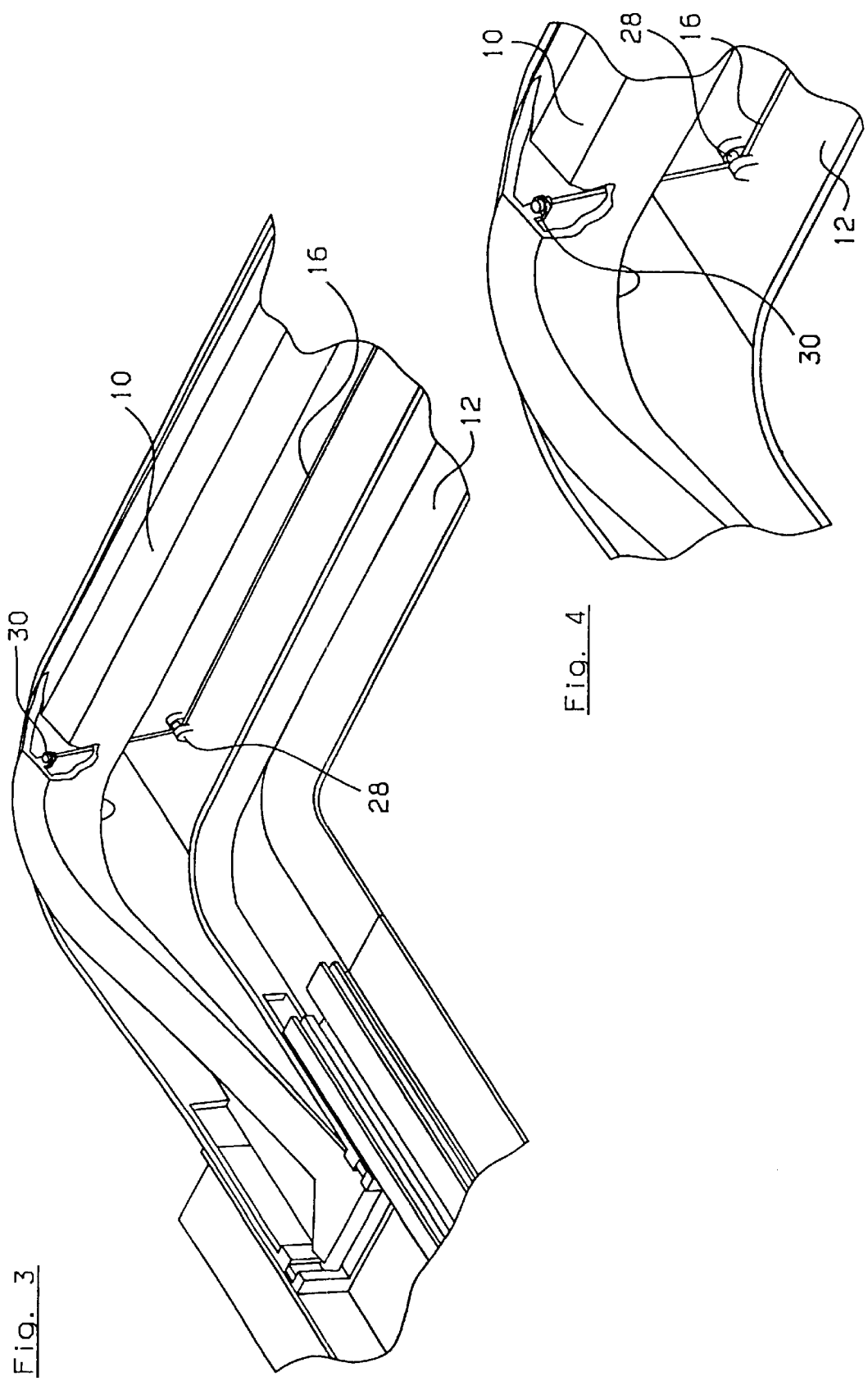

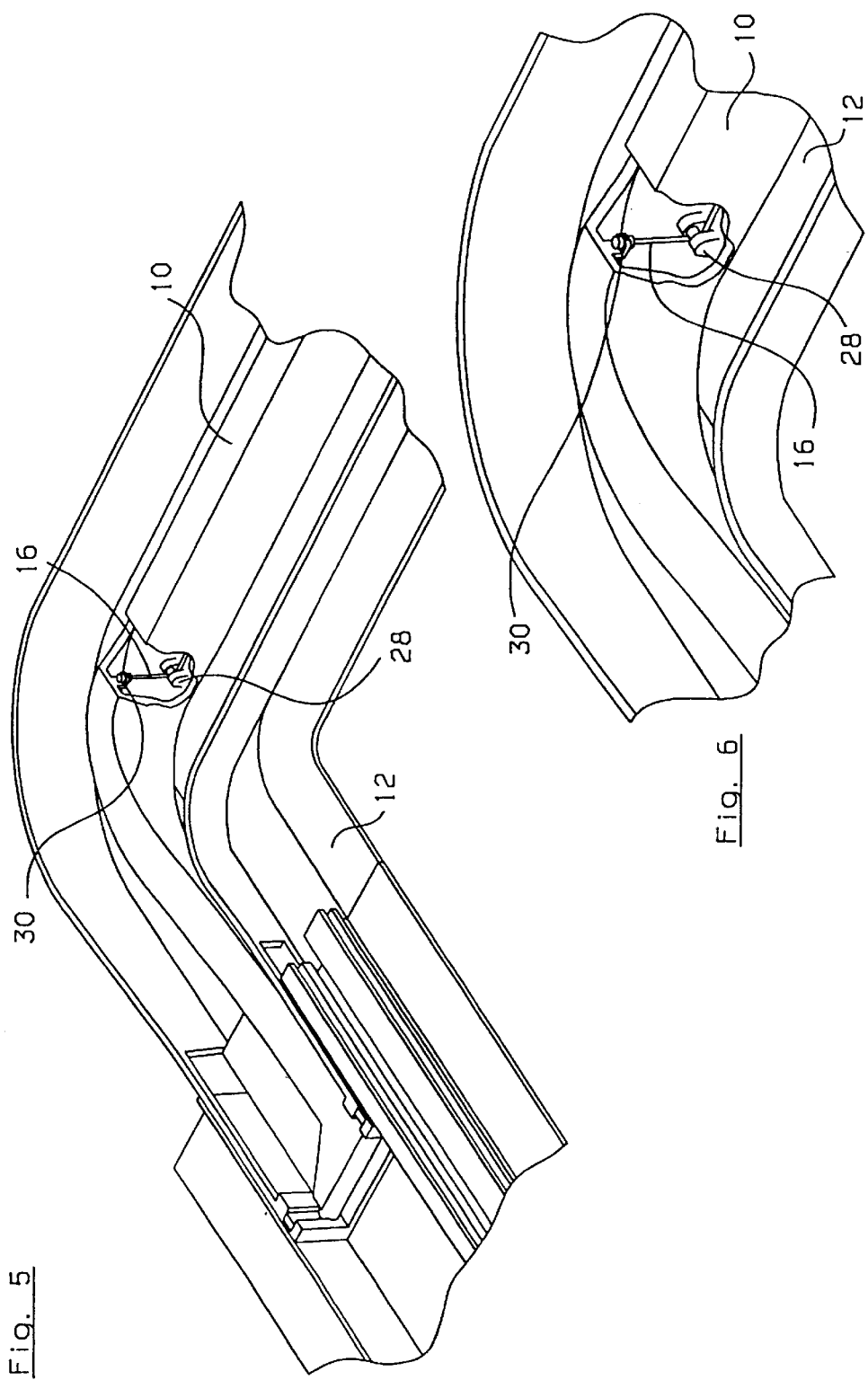

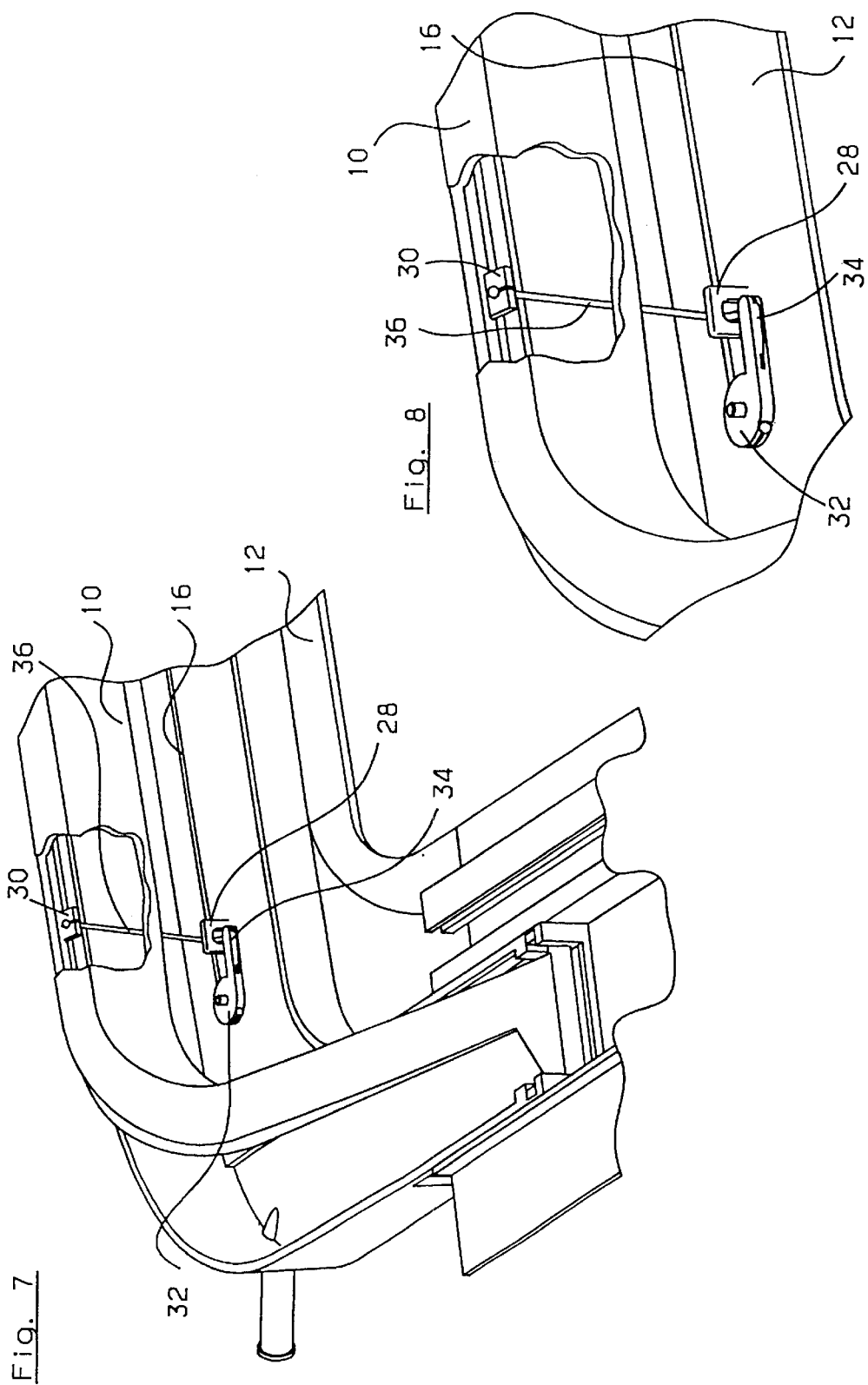

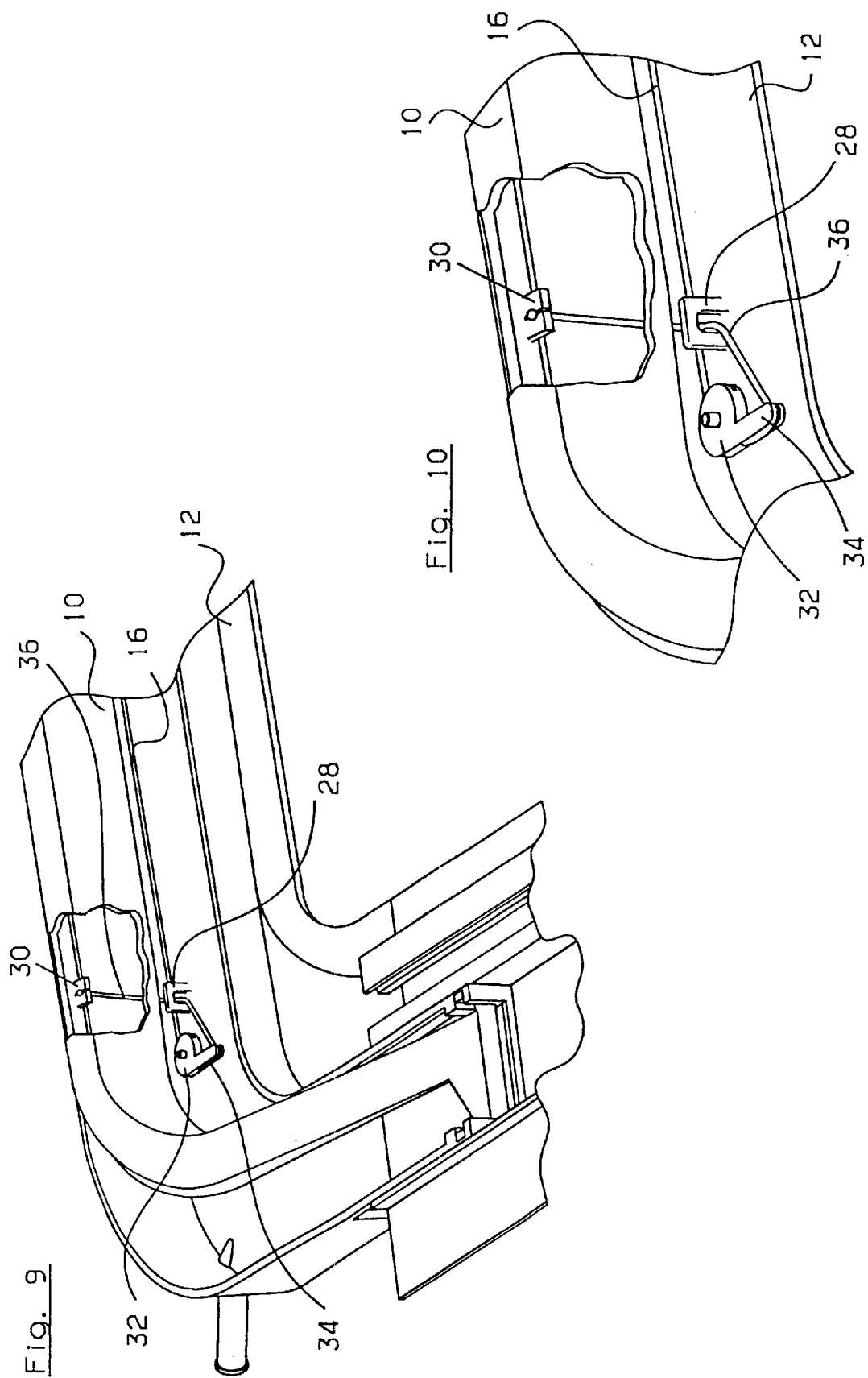

WIND DEFLECTOR INCLUDING AN OPERATING ELEMENT FOR A SLIDING ROOF SYSTEM

This application claims priority to German patent application number 101 42 047.1 filed Aug. 28, 2001.

The invention relates to a wind deflector.

A conventional wind deflector comprises an operating element for a sliding roof system, the wind deflector being movable by means of the operating element between a raised position and a lowered position. Such a wind deflector is known, for example, from DE 198 02 301 A1. In this wind deflector, there is provided a separate wind deflector electric motor which can be driven independently of the electric motor that is used for shifting a sliding roof cover of the sliding roof system.

The disadvantages of this known wind deflector are the high constructional expenditure and the high costs, in particular for the separate electric motor.

It is the object of the invention to further develop a wind deflector of the type initially mentioned to the effect that at a low constructional expenditure it can be moved between the lowered position and the raised position independently of the actuation of the sliding roof cover.

SUMMARY OF THE INVENTION

According to the invention, a wind deflector includes an operating element for a sliding roof system. The wind deflector is movable by means of the operating element between a raised position and a lowered position. The operating element consists of a shape memory alloy so that as a function of its temperature it can assume one of a first and second states. Such a shape memory alloy is also known as "two-way memory alloy". In the initial state, the alloy has a martensitic state. If the alloy is heated up beyond the martensitic transformation temperature, its crystal lattice arrives at the austenitic state. It is in this state that the operating element undergoes a change in shape through which the operating element is able to perform work. If the shape memory alloy cools down again, it returns to the martensitic state. In the process, the operating element returns to its first shape. Such transition between a first and a second state or a first and a second shape can be provoked virtually as often as desired.

For the purpose of changing the temperature of the operating element, there may be provided a power supply which is able to deliver a current flowing through the operating element. In this way the operating element is directly heated by the intrinsic resistance heat dissipation of the shape memory alloy, making possible very short switching times.

A particularly suitable material for the shape memory alloy is a NiTi alloy. This material allows a very high number of cycles. In addition, the transition temperature from the martensitic to the austenitic phase can be set over a wide range.

According to the preferred embodiment of the invention it is provided for that the wind deflector is able to perform an idle stroke without the operating element being shifted. Such an idle stroke is required, for instance, if the wind deflector is shifted by the sliding roof cover when the latter is opened or closed, without the operating element being actuated to this end.

According to the preferred embodiment of the invention it is provided for that the operating element is a wire which in its first state has a first length and which in its second state has a second length. This leads to a particularly compact embodiment. The wire may extend in parallelism to the wind deflector and underneath it. Thus, no additional space is required. During the transition from the martensitic state to the austenitic state, the wire shortens; in so doing, it can exert a comparably high tensile force. In this way high actuation forces can be provided.

A raising spring is preferably provided which biases the wind deflector into the raised position, the wire being able to pull the wind deflector from the raised position into the lowered position. This is particularly of advantage if an electronic control is additionally provided which controls the temperature of the operating element as a function of the wind noise generated by the sliding roof system. As soon as the electronic control detects such wind noise, for instance a thrumming which is a booming noise with very low frequency, the wire may be supplied with current, so that it brings the wind deflector into the lowered position. The resultant change in flow conditions in the sliding roof system is sufficient in many cases to eliminate the thrumming. It may be alternatively provided to retract the wind deflector as a function of the speed if it is known at which vehicle speed the low-frequency booming will occur.

It is preferably provided for that the wire directly engages the wind deflector, the wire extending along a supporting rail for the wind deflector and running through a deflecting element. This embodiment is distinguished by a particularly low constructional expenditure.

According to an alternative embodiment it is provided for that the wire engages a movable intermediate element and that a connecting element is mounted to the intermediate element, the connecting element being connected with the wind deflector. In this arrangement, the intermediate element is preferably a pivoting lever, the wire engaging the pivoting lever at a first radius that is shorter than a second radius where the connecting element engages. This embodiment results in a conversion of the operating stroke of the wire. Thus, the wire may be configured with a comparably short length. The operating forces that are made available by the wire when it shortens, are sufficient in any case to bring the wind deflector from the raised position into an at least partially lowered position, despite the stroke being transmitted.

According to an alternative embodiment, the pivoting lever may also be realized with a horizontally arranged swiveling axis, so that its pivoting arm moves in vertical direction. The pivoting arm may engage the wind deflector directly or by means of an intermediate lever.

Advantageous embodiments will be apparent from the subclaims.

BRIEF DESCRIPTION OF THE DRAWINGS

FIG. 1 shows in a schematic, perspective view a vehicle roof including a sliding roof cover, in which a wind deflector according to the invention is used;

FIG. 2 shows in a perspective, schematic and broken view a wind deflector which is used in the sliding roof system of FIG. 1;

FIG. 3 shows in a view corresponding to that of FIG. 2 a wind deflector according to a first embodiment in the raised state;

FIG. 4 shows a detail of FIG. 3 on an enlarged scale;

FIG. 5 shows the wind deflector of FIG. 3 in a lowered position;

FIG. 6 shows a detail of FIG. 5 on an enlarged scale;

FIG. 7 shows in a perspective view a wind deflector according to a second embodiment in the raised position;

FIG. 8 shows a detail of FIG. 7 on an enlarged scale;

FIG. 9 shows the wind deflector of FIG. 7, the operating element having performed an idle stroke; and FIG. 10 shows a detail of FIG. 9 on an enlarged scale.

DETAILED DESCRIPTION OF THE PREFERRED EMBODIMENTS

In FIG. 1 there is schematically shown a motor vehicle including a vehicle roof 5, with a sliding roof system including a sliding roof cover 7 being mounted therein. The sliding roof cover 7 can be brought from its closed position shown in FIG. 1 into an open position in which the cover is shifted the rear with respect to the longitudinal direction of the vehicle such that it frees the roof opening of the vehicle. At the front edge (indicated by reference numeral 9 in FIG. 1), as seen in the direction of motion, there is provided a wind deflector 10 (see FIGS. 2 to 6) which is movable between a raised position (see FIG. 3) and a lowered position (see FIG. 5). The wind deflector 10 is mounted to a supporting rail 12 which extends along the longitudinal edges of the roof opening and along the front edge 9, which at the same time may also serve for guiding the sliding roof cover 7. A raising spring 14 (see FIG. 2) is arranged between the wind deflector 10 and the supporting rail 12, which spring biases the wind deflector into the raised position. In a manner known per se, the sliding roof cover 7 cooperates with the wind deflector 10 such that the wind deflector is moved into the completely lowered position when the sliding roof cover is closed, and returns to the raised position again when the sliding roof cover is opened again.

An operating element 16 is provided by means of which the wind deflector 10 can be selectively brought from the raised position into a partially or completely lowered position, i.e. independently of the actuation by the sliding roof cover 7, while the sliding roof cover 7 is in the open position. The operating element 16 is formed by a wire that consists of an alloy having a shape memory, this alloy having as a function of its temperature a first state with a first length and a second state with a second length. In the first state, which exists at normal ambient temperature, the wire has a first length that is chosen such that the wind deflector 10 is in the raised position. If the wire has its second temperature, then it has a second length which is shorter than the first one. During transition from the first length to the shorter, second length the wire 16 pulls the wind deflector into the lowered position.

The second, higher temperature is generated by a heating current being sent through the wire 16. The current is provided by a power supply 18 which is connected through two connecting cables 20, 22 to the wire 16 such that the heating current can be sent through a major part of its length. The power supply 18 is controlled by an electronic control 24 which, in turn, receives signals from a sensor 26. The sensor 26 may be a microphone, for instance. In this way the electronic control 24 is able to detect whether a low-frequency booming occurs with the sliding roof cover 7 being in the open state, which can be eliminated by retracting the wind deflector 10. In this case, the electronic control 24 activates the power supply 18 which sends the heating current through the wire 16. Thereupon the latter gets hot by the intrinsic resistance heat dissipation accumulating in it, so that the wire shortens due to a transition from the martensitic state to the austenitic state. This shortening is converted such that the wind deflector is retracted either completely, if this is required, or at least partially, in fact so far that the booming is eliminated. When the wind deflector is again to be extended, delivering the heating current is interrupted, so that the wire 16 cools down. In the process, it returns to its martensitic state in which it again has the initial length. In so doing, the wind deflector returns to its raised position.

As can be seen in FIGS. 3 to 6, the wire 16 in the first embodiment is mounted parallel to the front section of the wind deflector 10, i.e. parallel to the front edge 9 of the roof opening, to the so-called front part of the supporting rail 12 underneath the wind deflector 10. At its right end which is not shown in FIGS. 3 to 6, the wire 16 is firmly secured to the supporting rail. From there it extends towards a deflecting element 28 where it is deflected vertically upwards to the wind deflector 10. The wire 16 is fixed to an attachment tab 30 on the wind deflector.

When the sliding roof cover 7 is closed with the wind deflector being raised, as is shown in FIGS. 3 and 4, the wind deflector 10 is pressed downwards into its lowered position. As the wire 16 is flexible, the wind deflector 10 can perform the idle stroke without any problems. When the wind deflector is to be transferred independently of the sliding roof cover 7 from the raised position shown in FIGS. 3 and 4 into the lowered position shown in FIGS. 5 and 6, a heating current is sent through the wire 16, so that the latter gets hot and shortens. During shortening, the end of the wire 16 attached to the attachment tab 30 is pulled closer to the deflecting element 28, whereby the wind deflector 10 arrives at the lowered position. In case the wind deflector 10 is to be extended again, the heating current is interrupted, so that the temperature of the wire drops to the value of the ambient temperature. The lengthening of the wire occurring therewith makes it possible for the raising spring 14 to press the wind deflector 10 into the raised position again.

The wire 16 is insulated with respect to the supporting rail on at least one of its sides, namely either on the deflecting element 28 or on its other end secured to the supporting rail 12, so that the heating current flows exclusively through the wire 16. The transition temperature at which the wire 16 changes from its longer, first state into its shorter, second state is chosen such that it lies above the maximum ambient temperature that is reached during operation of the vehicle, i.e. above approximately 40° C. Thereby it is ensured that the wire 16 is not heated by the air surrounding it to a temperature that lies above the transition temperature. In fact, in such case the wire 16 would always maintain the wind deflector 10 in the lowered position, independently of the heating current sent through it. It is not necessarily required that the transition temperature lies above the maximum temperature to which the vehicle is heated up, e.g. when exposed to sun radiation for a long time. Even if the temperatures that are reached in this case, for instance 80° C., lie above the transition temperature, the wind deflector will be held in the at least partially lowered position by the wire 16 which is then in the austenitic state, when the sliding roof cover is opened. As with the sliding roof cover being open, the temperature in the vicinity of the wind deflector will quickly drop to the temperature of the ambient air, in particular during driving, the wire 16 again reaches very fast its martensitic, i.e. longer state. The wind deflector 10 will then be extended, so that the usual operation will be possible. In case the delayed extending of the wind deflector—with the vehicle being strongly heated—is not desired, there can be used a shape memory alloy the transition temperature of which lies above approximately 80° C., for example.

In FIGS. 7 to 10 there is shown a wind deflector according to a second embodiment. For the components known from the first embodiment, there will be used the same reference numerals and it is referred to the above explanations.

Unlike the first embodiment, the wire 16 in the second embodiment does not directly engage the wind deflector 10. It instead engages an intermediate element 32 that is configured as a pivoting lever. The pivoting lever is provided with a pivoting arm 34 which is engaged by a connecting element 36. The connecting element 36 extends through the deflecting element 28 to the attachment tab 30 on the wind deflector 10. The connecting element 36 may be a flexible cable which supported by a spring (not shown) can be retracted into the pivoting lever. This state is shown in FIGS. 7 and 8. In FIGS. 9 and 10 the pivoting lever 32 is shown in a state after having performed an idle stroke. If starting from this state the wire 16 reduces its length, the pivoting lever 32 is swiveled clock-wise, so that the attachment tab 30 is pulled up close to the deflecting element 28 and the wind deflector 10 arrives at its lowered position. The advantage of this embodiment is that due to the differing radii, at which the wire 16 on the one hand and the connecting element 36 on the other engage the pivoting lever 32, there is made possible a conversion of the comparably small stroke of the wire 16 into a larger stroke of the connecting element 36. Thus, with a comparably short length of the wire 16 it is possible to obtain the full stroke of the wind deflector 10.

It is also possible to use the change in shape of the two-way memory alloy for the purpose of moving the cover of a rising roof between the closed position and the raised position, or vice versa.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sliding roof system comprising:
    a wind deflector movable by an operating element between a raised position and a lowered position;
    said operating element including a shape memory alloy having a first state and a second state which are a function of a temperature of said shape memory alloy, and said operating element is a wire which in said first state has a first length and which in said second state has a second length; and
    a raising spring is provided which biases said wind deflector into said raised position, and wherein said wire pulls said wind deflector from said raised position into said lowered position.

2. A sliding roof system comprising:
    a wind deflector movable by an operating element between a raised position and a lowered position; and
    said operating element including a shape memory alloy having a first state and a second state which are a function of a temperature of said shape memory alloy, said operating element is a wire which in said first state has a first length and which in said second state has a second length, and said wire directly engages said wind deflector, is mounted to a supporting rail, and extends along said supporting rail and runs through a deflecting element.

3. A sliding roof system comprising:
    a wind deflector movable by an operating element between a raised position and a lowered position; and
    said operating element including a shape memory alloy having a first state and a second state which are a function of a temperature of said shape memory alloy, and said operating element is a wire which in said first state has a first length and which in said second state has a second length, and wherein said wire directly engages said wind deflector.

4. The sliding roof system according to claim 1, wherein a power supply is provided to deliver a heating current which flows through said operating element.

5. The sliding roof system to claim 1, wherein said shape memory alloy is a NiTi alloy.

6. The sliding roof system according to claim 1, wherein said wind deflector is movable against said spring bias with said temperature being constant.

7. The sliding roof system according to claim 1, wherein said wire engages a movable intermediate element and wherein a connecting element is mounted to said intermediate element, said connecting element being connected with said wind deflector.

8. The sliding roof system according to claim 7, wherein said intermediate element is a pivoting lever and said wire engages said pivoting lever at a first radius that is shorter than a second radius where said connecting element engages said pivoting lever.

9. The sliding roof system according to claim 1, wherein an electronic control is provided which controls a temperature of said operating element as a function of a wind noise generated by said sliding roof system.

10. The sliding roof system according to claim 1, wherein an electronic control is provided which controls a temperature of said operating element as a function of a vehicle speed.

11. The sliding roof system according to claim 1, wherein an electronic control is provided which controls a temperature of said operating element as a function of pressure variations in a vehicle interior space.

12. The sliding roof system as recited in claim 1, wherein said wire pulls said wind deflector from said raised position to said lowered position when a transition temperature is reached.

13. The sliding roof system as recited in claim 1, wherein said second length is shorter than said first length.

14. The sliding roof system as recited in claim 1, wherein said wind deflector is in said raised position when said wire has said first length and is in said lowered position when said wire has said second length.

* * * * *